Sept. 18, 1934.  C. W. GARRISON  1,973,895
PROCESS OF PURIFYING OIL
Filed March 10, 1930
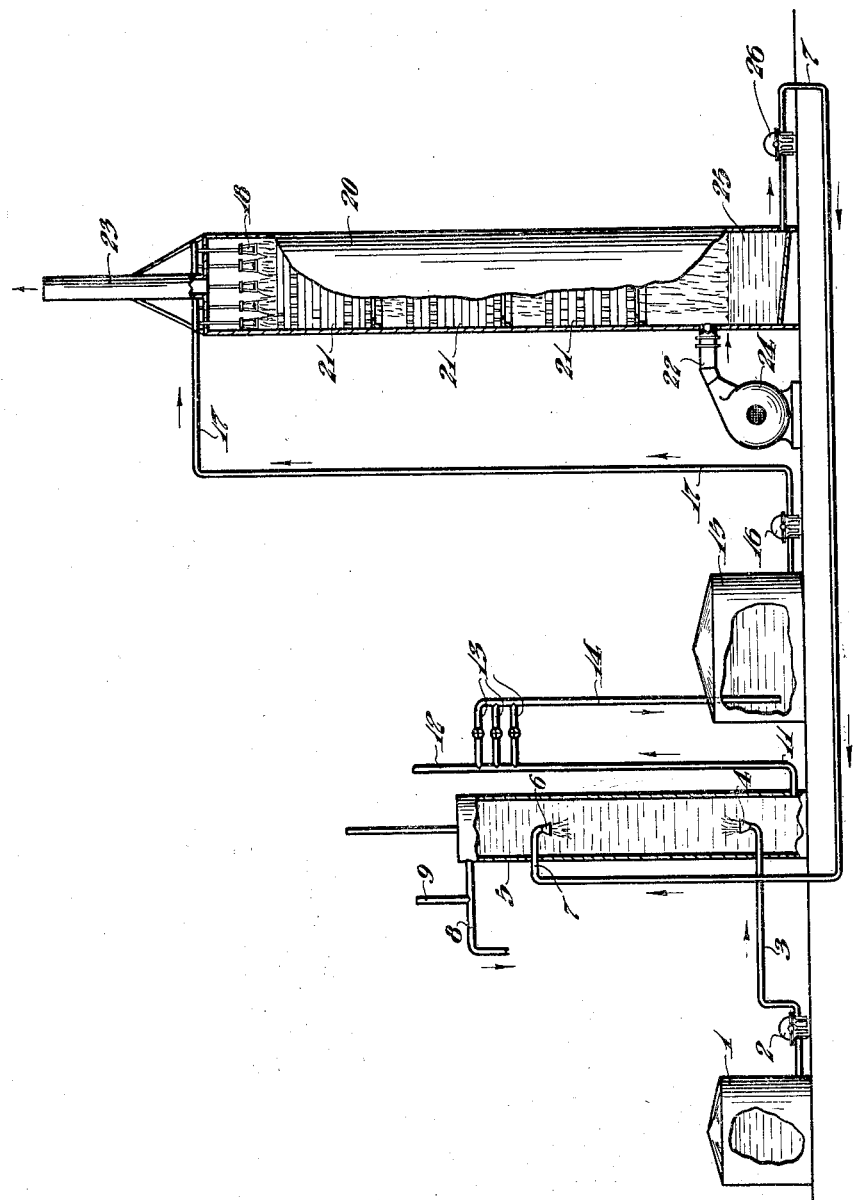
INVENTOR.
Clarence W. Garrison.
BY
Jesse R. Langley
ATTORNEY.

Patented Sept. 18, 1934

1,973,895

UNITED STATES PATENT OFFICE 1,973,895

PROCESS OF PURIFYING OIL

Clarence W. Garrison, Fort Wayne, Ind., assignor to The Koppers Company of Delaware, a corporation of Delaware Application March 10, 1930, Serial No. 434,490

1 Claim. (Cl. 196—32)

My invention relates to the treatment of hydrocarbon oils such as petroleum, petroleum distillates, hydrocarbon oils obtained from natural gas, coal gas and the like, and more particularly to the removal therefrom of sulphur impurities such, for example, as hydrogen sulphide and analogous impurities.

It has been customary for many years to treat such oils with solutions of sodium hydroxide for the removal therefrom of hydrogen sulphide and other sulphur impurities. However, this procedure has not in the past been carried out with regeneration and recirculation of the purifying liquid and is therefore uneconomical for the reason that fresh amounts of sodium hydroxide or its equivalent must be employed for each corresponding unit of impurity removed.

An object of my invention is the provision of a process of and apparatus for purifying oil in which the purifying liquid is substantially continuously recirculated through a cycle including a regeneration stage, so that it is used again and again.

A further object of my invention is the provision of a process of and apparatus for purifying oil in a continuous and cyclic manner whereby the optimum efficiency of absorption of impurities may be realized.

My invention has for further objects such other operations, advantages or results as may hereinafter be found to obtain.

My invention contemplates the substantially continuous washing of the oil to be purified with a regenerable purifying liquid, that is, a liquid capable of absorbing hydrogen sulphide or analogous impurities from the oil in amounts sufficient to accomplish a worthwhile purification of the oil and of then being rendered capable of further use for the same purpose by treatment with air, heating, reaction with a substance having a greater affinity for hydrogen sulphide than the liquid itself or any other treatment which can be carried out substantially without interrupting the cyclic recirculation of the purifying liquid.

By regeneration is meant merely the renewal of at least a substantial portion of the original capacity of the liquid for absorption of the impurity the removal of which is desired, but not necessarily a re-creation of the compound or compounds originally present in the liquid or a return to the full original capacity of said liquid for absorbing said impurity.

I prefer to employ as the purifying liquid a solution containing a compound of an alkali-forming metal or radical such, for example, as sodium, potassium, calcium, magnesium or ammonium and of these I ordinarily prefer a compound of sodium as being the most advantageous with respect to the ultimate economy of the system.

For example, I may employ a solution of sodium carbonate. A solution of sodium hydroxide itself may be used in the first instance, as for example in starting up the process, but in this case it is necessary in order to regenerate or actify the solution in order to introduce carbon dioxide either as a gas or in solution, or some other acidic substance of about the same strength.

When employing a simple solution of sodium carbonate, for example, of from 1 to 6% alkalinity, the regeneration or actification after absorption of impurity from the oil treated may be accomplished by subjecting the solution to a current of gas such as air or other gas containing little or no hydrogen sulphide, or by heating the solution, or both, the reaction involved being a simple reversal of the absorption reaction brought about by the reduction of the partial pressure of hydrogen sulphide in the atmosphere adjacent to the solution.

If a solution of caustic soda is employed in the first instance, it should be, as above set forth, regenerated at first in the presence of carbon dioxide but upon subsequent conversion of the active sodium into sodium carbonate or bicarbonate, further regeneration may be effected by means of a gas containing no carbon dioxide.

Other solutions may also be employed, for example, a solution prepared by dissolving sodium carbonate and arsenous oxide in water thereby forming, as is well known, a regenerable arsenic compound, which may comprise a sodium thioarsenate after initial contact with the sulphur-laden oil. When such solutions are employed, the regeneration or actification involves the liberation of elemental sulphur and a different type of reaction than is true when a simple sodium carbonate solution is used, and air or other gas containing free oxygen must then be used in order to secure proper actification and regeneration.

Moreover, in such instances it is ordinarily desirable to provide suitable means for substantially continuously removing the liberated sulphur, and in view of the fact that the oxygen contained in the actifying gas itself enters into the reaction, it is also desirable to provide apparatus whereby the efficiency of introduction of the actifying gas to the solution is promoted. For example, means for introducing the gas in a finely-divided form to a body of the liquid to be actified may be employed, thereby also facilitating the removal of sulphur by flotation.

In any event, in order to achieve a continuous process capable of employment over extended periods of time, the extent of the actification or regeneration must be such as to remove from the recirculated purifying liquid an amount of the impurity or impurities (either as such or in some other form) absorbed from the oil at least equal to the amount continuously removed from the oil treated. This does not, however, preclude the building up in the initial stages of the process of a certain amount of dissolved hydrogen sulphide which thereafter remains in the purifying liquid throughout the entire cycle of recirculation.

Among the advantages of the use of arsenical solutions of the character indicated for oil purification are the facts that such solutions are effective to remove certain organic sulphur impurities, such as mercaptans, from the oil, which is not generally true of simple sodium carbonate solutions or alkaline suspensions of iron or nickel compounds, and the absence of purifying compounds in suspension, which are subject to loss through entrainment by the oil as well as by the liberated sulphur.

In order that my invention may be fully set forth and understood I now describe, with reference to the accompanying drawing, a preferred form and a preferred manner in which my invention is embodied and practiced. In the drawing;

The single figure is a more or less diagrammatic view, partly in elevation and partly in vertical section, of apparatus for effecting the substantially continuous and cyclic purification of an oil by means of a regenerable purifying liquid.

Referring to the drawing, an oil to be purified from hydrogen sulphide is supplied from a source 1. This oil is conveyed by a pump 2 or any other suitable device through a conduit 3 terminating in an opening 4 within an oil treating chamber or absorber 5.

In the present instance it is assumed that the oil to be treated has a lower specific gravity than the purifying solution and for this reason the oil is introduced to the absorber 5 in the lower portion thereof but preferably still somewhat removed from the bottom of the absorber 5. The oil introduced through the opening 4 passes upward through the tower 5 in countercurrent to a flow of purifying liquid introduced above the point of introduction with the oil through an opening 6 in a conduit 7. The oil, by reason of its lower specific gravity, ultimately reaches the top of the absorber 5 and passes out through a conduit 8 having a vent 9.

The solution introduced through the conduit 7 to the absorber 5 may comprise a solution originally prepared by dissolving sodium carbonate in water and having a total alkalinity of from 1 to 6%. By reason of its higher specific gravity it passes downward through the absorber 5 in countercurrent to the rising flow of oil and during this intimate countercurrent contact absorbs hydrogen sulphide from the oil, thereby purifying the latter. The thereby fouled solution reaching the bottom of the absorber 5 is withdrawn through a sealed conduit 11 having a vent 12 and one of a plurality of offtakes 13 located at suitable levels with respect to the mixture of liquids within the absorber 5. The solution passes through the appropriate offtake 13 and a conduit 14 into a fouled liquid tank 15 from which it is substantially continuously delivered by means of a pump 16 through a conduit 17 and sprays 18 to an actifier 20.

The actifier 20 is of any suitable design, for example, an upright tower partially filled with wooden hurdles 21 or other suitable gas-and-liquid contact media. It is provided at the bottom with a conduit 22 for introducing the actifying gas and an outlet 23 for removing the same after contact with the fouled liquid. In the present instance air is employed as the actifying gas, being drawn from the atmosphere as desired by a fan 24 connected with the conduit 22.

The fouled solution passes downward through the actifier 20 and through contact with the rising current of air is deprived of hydrogen sulphide. The thereby actified solution collects in a reservoir 25, which is conveniently located at the bottom of the actifier 20, and is then forced by a pump 26 through the conduit 7 into the absorber 5 for further contact with oil.

The purifying liquid is thus substantially continuously recirculated through a cycle comprising the absorber 5 and the actifier 20 and there is accomplished on the one hand a purification of the flowing oil and on the other a regeneration or revivification of the purifying liquid.

During the continuance of the process, mechanical losses which inevitably occur and certain side reactions ordinarily take place. These result in the consumption of sodium or its equivalent for the formation of inert side products, such as sodium thiosulphate, and make it necessary to supply the recirculating liquid from time to time with further amounts of sodium carbonate or its equivalent. Similarly, portions of the recirculating solution may be discarded from time to time in order to limit the building up of inert materials in the recirculating system.

The foul actifier air leaving the actifier 20 may be simply wasted into the atmosphere, or it may be used for combustion purposes, or it may be purified in any suitable manner when so desired.

As a typical example of my process, it may be desired to purify a petroleum oil containing 0.15% by weight of hydrogen sulphide per gallon with a degree of purificaton of 90%. For this purpose, I may employ a solution containing sodium carbonate and sodium bicarbonate of approximately 2% total alkalinity. In the absorption stage 0.9 gallons of this solution are introduced per gallon of oil introduced and in the actification stage from 0.5 to 2 cubic feet of air are passed through the solution per grain of hydrogen sulphide removed from the oil. However, as will be appreciated by those skilled in the art, these figures will vary considerably according to the type of apparatus employed, the temperature of the recirculating liquid and the like and such details of operation are ordinarily best determined by experiment.

My invention is not limited to the specific details or examples set forth hereinabove but may variously be employed and embodied within the scope of the claim hereinafter made.

I claim as my invention:

The process of purifying hydrocarbon oil from sulphur contained as an impurity in said oil, which comprises subjecting the oil to contact with an aqueous solution of sodium carbonate and arsenous oxide.

CLARENCE W. GARRISON.